(12) United States Patent
Rieckmann

(10) Patent No.: US 9,350,874 B2
(45) Date of Patent: May 24, 2016

(54) METHOD OF TRANSMITTING SPEECH AND DIGITAL DATA VIA AN ANALOG SPEECH CHANNEL

(71) Applicant: Airbus Operations GmbH, Hamburg (DE)

(72) Inventor: Norbert Rieckmann, Hamburg (DE)

(73) Assignee: Airbus Operations GmbH (DE)

( * ) Notice: Subject to any disclaimer, the term of this patent is extended or adjusted under 35 U.S.C. 154(b) by 125 days.

(21) Appl. No.: 14/445,208

(22) Filed: Jul. 29, 2014

(65) Prior Publication Data
US 2015/0036697 A1 Feb. 5, 2015

(30) Foreign Application Priority Data

Jul. 31, 2013 (EP) ..................................... 13178803

(51) Int. Cl.
*H04J 3/00* (2006.01)
*H04M 11/06* (2006.01)
*H04L 27/00* (2006.01)

(52) U.S. Cl.
CPC ......... *H04M 11/062* (2013.01); *H04L 27/0002* (2013.01); *H04M 11/064* (2013.01); *H04M 11/066* (2013.01)

(58) Field of Classification Search
CPC ................. H04J 2011/0003; H04J 2011/0006; H04J 2011/0016; H04J 1/04; H04J 1/06; H04J 3/06; H04L 1/0042; H04B 7/185–7/18508
USPC .......... 370/319–321, 330, 336–337, 343–345
See application file for complete search history.

(56) References Cited

U.S. PATENT DOCUMENTS

| | | | |
|---|---|---|---|
| 3,304,372 A | 2/1967 | Filipowsky et al. |
| 3,492,429 A | 1/1970 | Schroeder |
| 5,136,586 A | 8/1992 | Greenblatt |
| 5,757,788 A | 5/1998 | Tatsumi et al. |

(Continued)

FOREIGN PATENT DOCUMENTS

| | | |
|---|---|---|
| EP | 0 507 684 A1 | 10/1992 |
| EP | 0 653 871 A1 | 5/1995 |
| WO | 85/02959 A1 | 7/1985 |

OTHER PUBLICATIONS

European Search Report 13178803.6 (Dec. 20, 2013).

*Primary Examiner* — Andrew Chriss
*Assistant Examiner* — Kenan Cehic
(74) *Attorney, Agent, or Firm* — Lerner, David, Littenberg, Krumholz & Mentlik, LLP

(57) ABSTRACT

A method of transmitting speech and digital data via an analog speech channel within a single frequency band, wherein an analog speech signal is transmitted via the speech channel and a stream of digital data is encoded by an encoding device to a sequence of blocks of symbols taken from a predetermined set of symbols. The transmission of the analog speech signal is periodically blanked during predetermined spaced time intervals, and the blocks of symbols are transmitted during the time intervals. In each time interval a plurality of signals are transmitted via a corresponding plurality of spaced predetermined carrier frequencies. A receiver receives the analog speech signal and the signals transmitted during the time intervals. The signals are demodulated to recover the individual symbols and the respective block of symbols transmitted during the time interval groups, and the digital data is recovered by decoding recovered blocks of symbols.

11 Claims, 3 Drawing Sheets

(56) References Cited

U.S. PATENT DOCUMENTS

| | | | |
|---|---|---|---|
| 6,650,717 B1* | 11/2003 | Cupo et al. | 375/353 |
| 2002/0059623 A1* | 5/2002 | Rodriguez et al. | 725/91 |
| 2003/0149988 A1* | 8/2003 | Ellis et al. | 725/87 |
| 2005/0207511 A1* | 9/2005 | Madhavan et al. | 375/303 |
| 2005/0246758 A1* | 11/2005 | Khandelwal et al. | 725/138 |
| 2006/0287003 A1* | 12/2006 | Moinzadeh et al. | 455/557 |
| 2014/0192770 A1* | 7/2014 | Soldati et al. | 370/330 |
| 2015/0003409 A1* | 1/2015 | Hoymann | 370/330 |

* cited by examiner

METHOD OF TRANSMITTING SPEECH AND DIGITAL DATA VIA AN ANALOG SPEECH CHANNEL

BACKGROUND OF THE INVENTION

In many fields of technology the transmission of speech is carried out in analog form, i.e. via an analog transmission channel, which is also referred to as speech or voice channel. One example is the radio communication between the crew onboard aircraft and ground personnel, e.g. between the pilots and the tower. Such radio communication may be effected, for example, using the HF frequency range in order to allow for long range communication.

It is often desirable to also transmit data in addition to speech. Although this can be done by separate means and via a separate channel, it is potentially more efficient and cost effective to transmit the speech and the data over the same channel. However, due to the limited bandwidth of the speech channels used for transmission of speech, it is problematic to achieve a reasonably high data rate without compromising the quality of the speech transmission.

BRIEF SUMMARY OF THE INVENTION

An aspect of the present invention provides a simple and cost efficient method of transmitting speech and digital data via an analog speech channel within a single frequency band, which method is nevertheless capable of achieving high data rates without significantly affecting the quality of the speech transmission.

According to an aspect of the invention, a method of transmitting speech and digital data via an analog speech channel within a single frequency band is provided, wherein the speech is transmitted via the speech channel in analog form. In particular, the transmission may be effect in such a manner that the speech transmission utilizes the entire or essentially the entire frequency range of the frequency band. The frequency band is defined by and part of the specification of the speech channel. The transmission of the speech in analog form may be effected by any known means employing any known modulation techniques, such as, e.g., amplitude or frequency modulation.

The speech is transmitted over the speech channel in the form of an analog speech or voice signal, i.e. an analog signal representing speech or voice, by means of a transmitter. As will become apparent from the below further explanations, this transmission is essentially identical to the common transmission of analog speech signals.

A stream of digital data, for example, in particular, a stream of digital data in the form of a bit stream, is encoded to a sequence of blocks of symbols by means of an encoding device or encoder, which is preferably a part of or included in the transmitter.

In accordance with the common meaning of the term "symbol" a symbol is one of several possible discrete values a data element of a sequence of data elements can assume or represent. For example, in the case of a sequence of bits, each bit is a data element and the two possible symbols are "0" and "1". By allowing for more symbols more than one bit of information can be transmitted in a single symbol. A "block of symbols" is a group of successive or adjacent symbols from a sequence of symbols.

Thus, by means of the encoding process the stream of digital data is represented by several groups or blocks of symbols, such that it is possible to recover the original stream of digital data from the sequence of blocks of symbols. In the simplest case the stream of digital data is divided into a plurality of equal lengths data words, and the encoding unambiguously maps these data words to code words, wherein each code word consists of a plurality of symbols. In the case of the stream of digital data being a bit stream each data word corresponds to a different combination of bits.

The encoding step is carried out in such a manner that each block of symbols includes the same number of s symbols, with s being an integer and s≥2. Further, each symbol is taken from a predetermined set of symbols, also referred to as symbol alphabet, consisting of t different symbols, with t being an integer and t≥2. Consequently, each symbol carries more than one bit of information.

For transmitting the blocks of symbols from the sequence of blocks of symbols over the speech channel by using the transmitter, the transmission of the analog speech signal is periodically blanked or suppressed during predetermined spaced time intervals, i.e. the analog speech signal is temporarily not transmitted during the time intervals and is only transmitted in the manner described above outside the time intervals. In each of the time intervals a plurality of signals are transmitted via a corresponding plurality of spaced predetermined carrier frequencies within the frequency band. Preferably, only the signals are transmitted during the intervals in order to facilitate recovery of the signals upon reception, and for this purpose a suitable notch filter may be used.

Each block of symbols from the sequence of blocks of symbols is transmitted during a different time interval group. Each such time interval group consists of the same predetermined number g of time intervals, with g being a positive integer. In particular, g may be 1 or, preferably, 2. Different time interval groups include different time intervals, so that each time interval belongs to only one time interval group. Preferably, for g≥2 each time interval group includes successive time intervals.

For each block of symbols from the sequence of blocks of symbols all symbols from the respective block of symbols are associated by a predetermined one-to-one relationship with exactly one of the predetermined carrier frequencies in one of the time intervals of the respective time interval group, so that each symbol can be transmitted over a different one of the carrier frequencies available in the time intervals of the time interval group. In this regard, the carrier frequencies having the same frequency value, but included in different time intervals are considered to constitute different carrier frequencies. In other words, a carrier frequency is characterized by its frequency value and by the time interval to which it belongs.

For the purpose of actually transmitting the symbols each carrier frequency associated with a symbol is modulated by means of a modulating device such that the signal transmitted via the respective carrier frequency assumes one of t predetermined conditions representative of the respective symbol to be transmitted via that carrier frequency. In other words, as usual, each of the t predetermined conditions represents bijectively a different one of the t symbols from the symbol alphabet, and the data signal transmitted via a carrier frequency corresponds to the carrier frequency being modulated such that a signal having the respective condition results. The t predetermined conditions are chosen such that they can be distinguished and detected at a receiver. They may be, for example, an amplitude, a frequency, or a phase value.

Consequently, during each time interval a multi-frequency pulse is transmitted carrying information pertaining to the blocks of symbols. The time intervals and the pulses can be kept so short that, depending on the particular application at issue, the influence on the quality of the speech signal recovered at a receiver end is not noticeable or minimal.

A receiver is used to receive the analog speech signal and to receive the data signals transmitted during the time intervals. For the latter purpose a notch filter may be used. Due to the fact that the time intervals are predetermined, i.e. the time of their occurrence and their duration, the data signals can be easily distinguished from the analog speech signal.

A demodulating device, which is preferably part of or included in the receiver, is used to demodulate for each time interval group the signals received on the corresponding carrier frequencies and to recover on this basis the individual symbols and the respective block of symbols transmitted during the respective time interval group.

Finally, a decoding device, which is preferably part of or included in the receiver, is used to decode the recovered blocks of symbols to recover the digital data.

Of course, the demodulating device and the decoding device have to able to reverse the modulation step and the encoding step, respectively.

The above method provides the advantage that the time intervals can be chosen such that the impact of the data transmission on the speech transmission is negligible, but that at the same time a high data rate is achieved due to the simultaneous transmission of multiple symbols from a tri-value (ternary) or higher value symbol alphabet over multiple discrete carrier frequencies. If the number of available carrier frequencies in a time interval group is c, then up to a maximum of $t^c$ different possible information values can be transmitted in a single time interval group.

Preferably, the length of the individual time intervals, the number of time intervals per time interval group and the spacing between time interval groups is chosen such that for each time period from the beginning of one time interval group and the beginning of the subsequent time interval group the proportion of the time intervals is less than 5%, preferably less than 4%, more preferably less than 3%, even more preferably less than 2% and most preferably less than 1%.

In a preferred embodiment, for each time interval group the signal transmitted via a predetermined carrier frequency in a predetermined time interval of the group is a synchronization signal. For example, for time interval groups consisting of two time intervals the highest carrier frequency of the first time interval may be used to always transmit a predefined synchronization signal.

In a preferred embodiment the encoding step is carried out such that each block of symbols includes symbols representing a transmitter ID characteristic of the transmitter utilized for transmitting the speech and digital data. The symbols representing the transmitter ID may be added to the symbols actually representing the stream of digital data. On the basis of the transmitter ID the receiver is able to identify, for example, a scrambling method used by the specific transmitter.

In a preferred embodiment encoding the stream of digital data by means of the encoding device includes dividing the stream of digital data into digital data blocks, each corresponding to one of the blocks of symbols. For example, for a bit stream the digital data blocks are blocks of a plurality of bits. For each digital data block a unique identifier, preferably a number, is determined using a predetermined look-up table associating each possible data sequence which can form a digital data block with a different identifier. In other words, the look-up table includes all possible data words, i.e. all possible combinations of data elements (e.g. for a bit stream all possible combinations of bits) which may constitute a digital data block, and each of the possible data words is assigned a different identifier. Then, a predetermined relationship is used to determine for each identifier a plurality of symbols representing the respective identifier, and the determined plurality of symbols is used to construct the respective block of symbols. In this manner, each block of symbols represents exactly one of the identifiers.

Accordingly, decoding the recovered blocks of symbols by means of the decoding device comprises for each recovered block of symbols to determine the identifier represented by the plurality of symbols included in the respective block of symbols, and using the look-up table to determine the data sequence associated with the identifier and, thereby, the digital data block.

Using the look-up table provides the advantage that a scrambling can be achieved because without the look-up table it is not possible to recover the digital data blocks from the received symbols. Further, in case not all conceivable data words are possible, such impossible data words can be omitted from the look-up table, so that a data reduction may be achieved for transmission.

In a preferred embodiment each time interval group consists of two time intervals. However, one time interval or more than two time intervals are also possible. In the case of two or more time intervals per time interval group it is preferred that the distance between successive time intervals belonging to the same time interval group is shorter than the distance between the last time interval and the first time interval of successive time interval groups.

In a preferred embodiment t is equal to 3, i.e. a tri-state or ternary symbol alphabet is used. In particular for HF transmission it has been found that such an alphabet allows for reliable and simple distinction and detection of the different symbols by ordinary receiver hardware.

In a preferred embodiment the frequency band is in the HF or VHF range.

In a preferred embodiment the speech channel includes an air interface, i.e. the transmission of speech and data is effected wirelessly.

In a preferred embodiment the time intervals are concealed upon reception of the analog speech signal by interpolating the analog speech signal between the speech signal prior to and after each time interval.

In a preferred embodiment each time interval includes at least 16 carrier frequencies. Thus, for example, for time interval groups consisting of two time intervals, carrier frequencies are available. If one carrier frequency is utilized for transmitting a synchronization signal and four carrier frequencies are utilized for transmitting a transmitter ID, then 27 carrier frequencies are available for the actual data transmission.

Any of the above embodiments may be advantageously used for transmitting speech and digital data between an aircraft and a ground station or between different aircraft.

BRIEF DESCRIPTION OF THE DRAWINGS

In the following an exemplary embodiment of the invention is explained in more detail with reference to the figures.

FIG. 3 shows an exemplary look-up table using for encoding the input bit stream.

DETAILED DESCRIPTION

Figure 1:
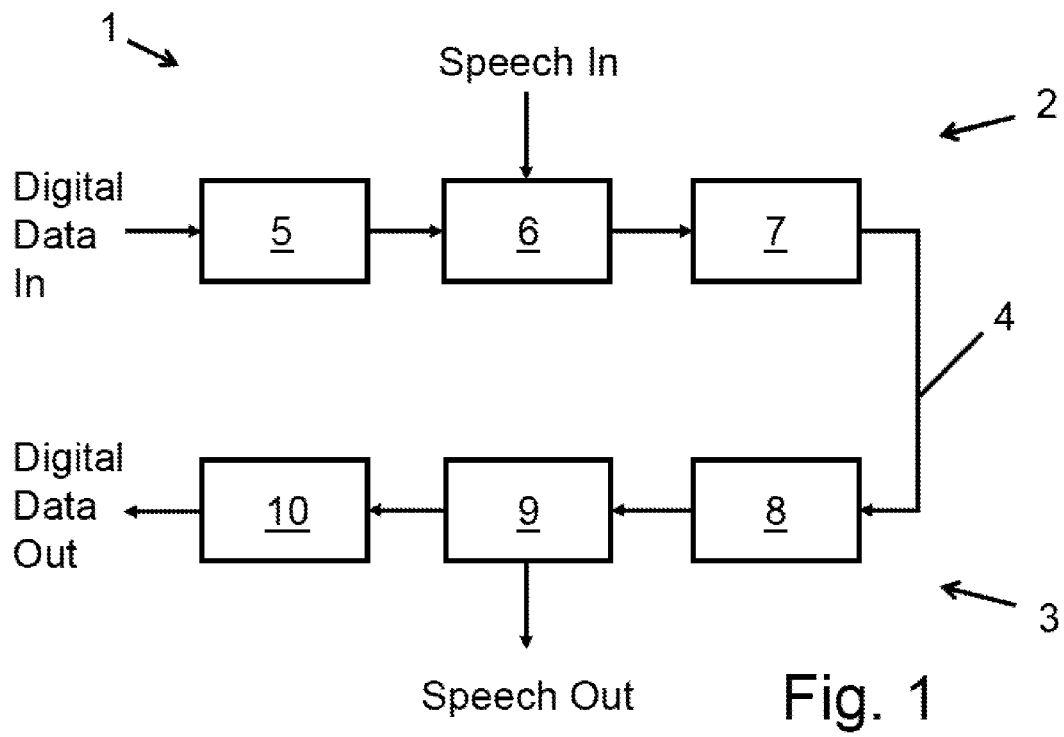
FIG. 1 shows a schematic block diagram of a system which is adapted for carrying out a method according to an embodiment of the present invention.

The system 1 schematically depicted in FIG. 1 includes a transmitting side 2, a receiving side 3 and an analog speech or channel 4 between the transmitting side 2 and the receiving side 3, over which speech channel 4 speech and data can be transmitted. The speech channel 4 is part of an air interface, i.e. the speech and data transmission is carried out wirelessly.

The transmitting side 2 generally comprises an encoding device 5, a modulating device 6 and a transmitter 7, and the receiving side generally comprises a receiver 8, a demodulating device 9 and a decoding device 10.

Analog speech information is applied to an input of the modulating device 6 which is adapted to carry out a suitable modulation such that the transmitter 7 is able to transmit the speech information in a predetermined frequency band defined by the speech channel 4. Correspondingly, the demodulating device 9 is adapted to demodulate the received signal following transmission via the speech channel 4 and reception at the receiver 8, and to output the speech information in analog form.

Further, digital data in the form of a bit stream is applied to an input of the encoding device 5, and the encoding device 5 is adapted to divide the bit stream into a plurality of data words, each consisting of a predetermined number of bits, and to determine and output for each data word a corresponding code word. The code words each consist of a plurality of symbols from a predetermined symbol alphabet consisting of three symbols, i.e. a tri-value, tri-state or ternary symbol alphabet. The code words are provided to an input of the modulating device 6, and the modulating device 6 is adapted to suitably modulate the signal transmitted by the transmitter 7 in order to transmit the code words via the speech channel 4. Correspondingly, the demodulating device 9 is adapted to demodulate the received signal following transmission via the speech channel 4 and reception at the receiver 8, and to output the demodulated code words to the decoding device 10. The decoding device 10 is in turn adapted to recover the data words and, thus, the bit stream, from the code words by reversing the encoding process.

Figure 2:
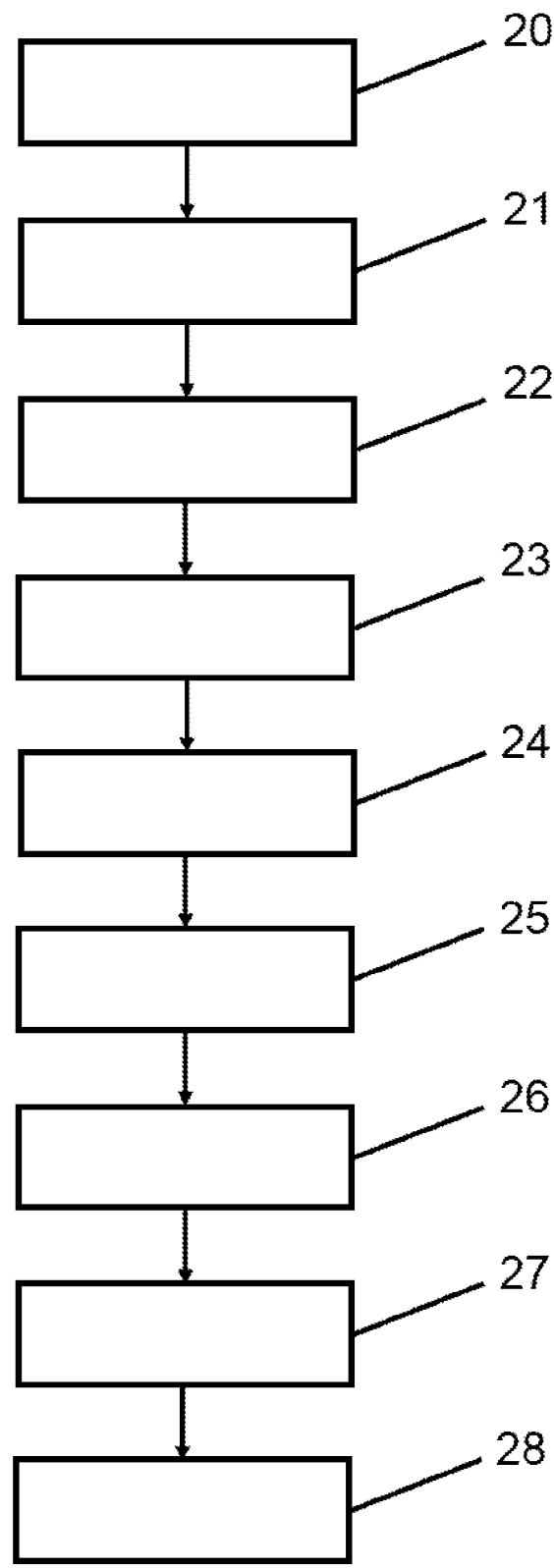
FIG. 2 shows a flow chart illustrating a method according to an embodiment of the present invention.

FIG. 2 is a flow chart showing in detail an embodiment of the above transmission method.

In step 20 the transmitter 7 is continuously supplied with modulated speech information, and a corresponding analog speech signal is transmitted by the transmitter 7 in analog form via the speech channel 4. As will become apparent from the below explanations, the transmitter 7 continuously transmit the speech signal, with the exception of predetermined time intervals.

In step 21 the encoding device 5 is used to divide the input bit stream into a plurality of equal length successive data words, i.e. each such data word is a particular combination of bits.

In step 22 a predetermined look-up table, which may be specific to the transmitter 7, is used to determine for each data word a corresponding identifier in the form of a number. In this regard the look-up table includes all possible data words, and assigns to each such possible data word included in the table a different number, so that the number unambiguously represents the respective data word. An example of such a look-up table is illustrated in FIG. 3. The exemplary look-up table 30 includes n columns and m lines, wherein n is the length or number of bits of the data words 31. For facilitating understanding of the illustrated look-up table the columns have been numbered from 1 to n and the lines have been numbered from 1 to m in FIG. 3. However, the line and the column including these numberings do not belong to the actual exemplary look-up table 30. For determining the number assigned to a particular data word 31, the data word 31 is searched in the look-up table 30, and the number of the line in which the data word 31 has been found is taken as the assigned number 32.

As can be seen in FIG. 3, the data words 31 are not ordered according to the value represented by the respective bit combinations, but are "scrambled", so that without the look-up table 30 it is not possible to recover the data word from the number. Further, due to the fact that the look-up table 30 only includes those data words 31 which can actually occur, m is less than the number of all possible of bit combinations of n bits. Thus, less than n bits are required for representing a number 32 assigned to a data word 31, so that a data reduction is achieved.

In step 23 each number determined in step 22 and representing a different one of the data words is represented unambiguously by a code word consisting of s symbols of the above-mentioned ternary symbol alphabet. This is done using a predetermined relationship. Thus, at the end of step 23 a sequence of code words or blocks of symbols of equal length are present, which sequence is an encoded representation of the input bit stream.

Figure 4:
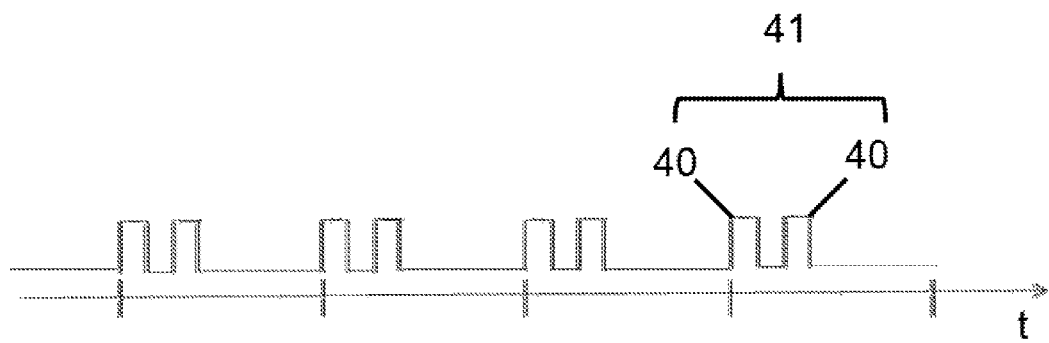
FIG. 4 shows time intervals used for transmitting the digital data.

In step 24 the transmission of the analog speech signal is periodically blanked during predetermined and spaced time intervals 40 illustrated in FIG. 4 (for reasons of clarity only two of the shown time intervals are actually designated by reference numerals). As can be taken from FIG. 4, the time intervals 40 are arranged in time interval groups 41, each consisting of two time intervals 40. The time intervals 40 within a single group 41 are spaced more closely than time intervals 40 of different groups 41. Due to the blanking, the transmission of the analog speech signal is only effected outside the time intervals 40, so that small portions of the speech signal are missing at the receiving side 3. For each time period between the beginning of one group 41 and the beginning of the next group the proportion of the time intervals is 4% or less.

In step 25 the transmitter 7 is used to transmit the code words via the speech channel 4 during the time intervals 40. This is effected by transmitting, in each of the time intervals 40, a plurality of signals via a corresponding plurality of spaced predetermined carrier frequencies 50 within the frequency band.

Figure 5:
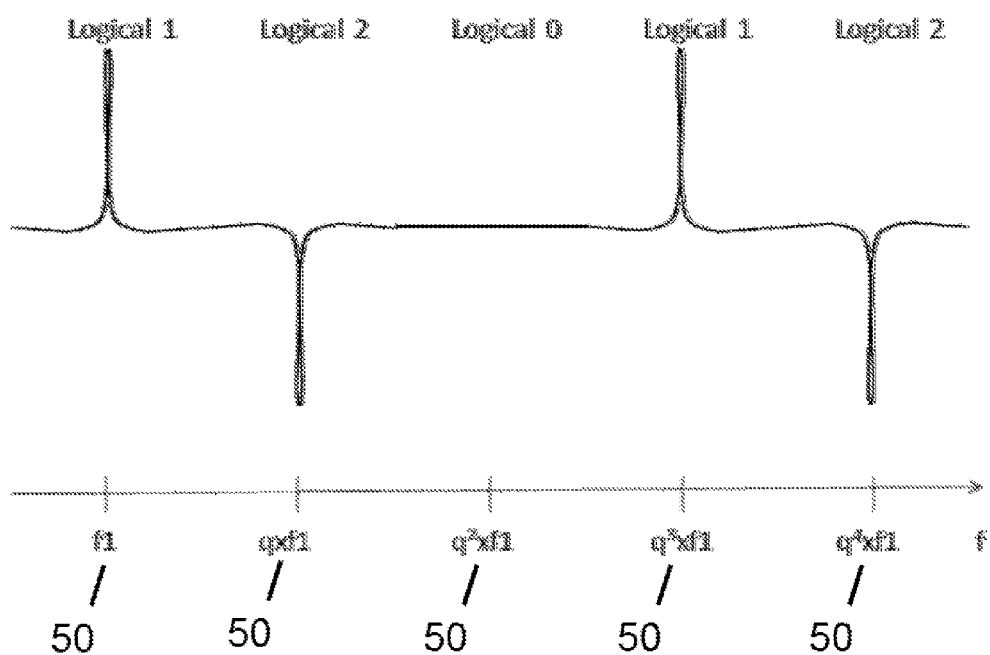
FIG. 5 shows a plurality of spaced carrier frequencies used for transmitting a plurality of data signals during one of the time intervals 40.

These carrier frequencies 50 are illustrated for one of the time intervals 40 in FIG. 5. Each time interval "includes" the same carrier frequencies 50. In the exemplary embodiment 16 carrier frequencies 50 are provided in each time interval 40, wherein adjacent carrier frequencies 50 are spaced by, e.g., 15% of the lower one of the respective two adjacent carrier frequencies 50, i.e. the factor q indicated in FIG. 5 is then 1.15.

It is further illustrated in FIG. 5 that on each carrier frequency 50 a signal having three possible states representing the three possible symbols 0, 1 and 2 is transmitted by way of suitable modulation using the modulation device 6. In FIG. 5 different amplitudes are utilized to represent the different symbols.

More particularly, each code word is transmitted during a different time interval group 41, and for each code word the symbols making up the respective code word are associated by a predetermined one-to-one relationship with one of the predetermined carrier frequencies 50 in one of the two time intervals 40 of the respective time interval group 41. Thus, carrier frequencies 50 of different time intervals 40 are considered to be different carrier frequencies 50, even if they have the same frequency value. Each carrier frequency 50 associated with a symbol is modulated by means of the modulating device 6 such that the signal transmitted via the respective carrier frequency 50 assumes one of the three predetermined amplitude conditions shown in FIG. 5 and representative of the respective symbol to be transmitted via that carrier frequency 50.

In step 26 the receiver 8 is used to receive the analog speech signal and to receive the signals transmitted during the time intervals 40.

In step 27 the demodulating device 9 is used to demodulate for each time interval group 41 the signals received on the corresponding carrier frequencies 50 to recover the individual symbols and the respective code words transmitted during the respective time interval group 41.

Finally, in step 28 the decoding device 10 is used to decode the recovered code words to in turn recover the corresponding data words and, eventually, the bit stream. For this purpose, for each recovered code word the number represented by the code word is determined, and the look-up table is used to determine the data word associated with the number.

The invention claimed is:

1. A method for transmitting speech and digital data via an analog speech channel within a single frequency band, wherein the speech is transmitted via the speech channel in analog form, the method comprising:
   using a transmitter to transmit an analog speech signal in analog form via the speech channel;
   using a encoding device to encode a stream of digital data to a sequence of blocks of symbols, wherein each block of symbols includes s symbols and each symbol is taken from a predetermined set of symbols consisting of t different symbols, wherein t and s are predetermined integers greater than 2;
   periodically blanking the transmission of the analog speech signal during predetermined spaced time intervals;
   using the transmitter to transmit the blocks of symbols from the sequence of blocks of symbols during the time intervals, wherein
   in each of the time intervals a plurality of signals are transmitted via a corresponding plurality of spaced predetermined carrier frequencies within the frequency band,
   each block of symbols is transmitted during a different time interval group, each consisting of a same predetermined number g of the time intervals, with g being a positive integer,
   for each block of symbols all symbols from the respective block of symbols are associated by a predetermined one-to-one relationship with one of the predetermined carrier frequencies in one of the time intervals of the respective time interval group, and
   each carrier frequency associated with a symbol is modulated by a modulating device such that the signal transmitted via the respective carrier frequency is in form of one of t predetermined conditions representative of the respective symbol to be transmitted via that carrier frequency;
   using a receiver to receive the analog speech signal and to receive the signals transmitted during the time intervals;
   using a demodulating device to demodulate for each time interval group the signals received on the corresponding carrier frequencies to recover individual symbols and the respective block of symbols transmitted during the respective time interval group; and
   using a decoding device to decode the recovered blocks of symbols to recover the digital data.

2. The method according to claim 1, wherein during each time interval group the signal transmitted via a predetermined carrier frequency in a predetermined time interval of the group is a synchronization signal.

3. The method according to claim 1, wherein the encoding step is carried out such that each block of symbols includes symbols representing a transmitter ID characteristic of the transmitter utilized for transmitting the speech and digital data.

4. The method according to claim 1, wherein the encoding the stream of digital data by the encoding device further comprises:
   dividing the stream of digital data into digital data blocks, each corresponding to one of the blocks of symbols;
   determining for each digital data block an identifier using a predetermined look-up table associating each possible data sequence which can form a digital data block with a different identifier; and
   using a predetermined relationship to determine for each identifier a plurality of symbols representing the respective identifier and including the determined plurality of symbols to construct the respective block of symbols and;
   the decoding the recovered blocks of symbols by the decoding device comprises, for each recovered block of symbols;
   determining the identifier represented by the plurality of symbols included in the respective block of symbols; and
   using the look-up table to determine the data sequence associated with the identifier.

5. The method according to claim 1, wherein each time interval group consists of two time intervals.

6. The method according to claim 5, wherein the distance between successive time intervals belonging to the same time interval group is shorter than the distance between the last time interval and the first time interval of successive time interval groups.

7. The method according to claim 1, wherein t=3.

8. The method according to claim 1, wherein the frequency band is in the High Frequency (HF) or Very High Frequency (VHF) range.

9. The method according to claim 1, wherein the speech channel includes an air interface.

10. The method according to claim 1, wherein upon reception of the analog speech signal the time intervals are concealed by interpolating the analog speech signal between the speech signal prior to and after the respective time interval.

11. The method according to claim 1, wherein each time interval includes at least 16 carrier frequencies.

* * * * *